(12) United States Patent
Mizoguchi (10) Patent No.: US 12,555,828 B2
(45) Date of Patent: Feb. 17, 2026

(54) NON-AQUEOUS ELECTROLYTE SECONDARY BATTERY, COLLECTOR, METHOD FOR MANUFACTURING NON-AQUEOUS ELECTROLYTE SECONDARY BATTERY, AND METHOD FOR MANUFACTURING COLLECTOR (71) Applicant: FUJIFILM Corporation, Tokyo (JP)

(72) Inventor: Takao Mizoguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 739 days.

(21) Appl. No.: 17/844,036

(22) Filed: Jun. 19, 2022

(65) Prior Publication Data

US 2022/0328885 A1  Oct. 13, 2022

Related U.S. Application Data (63) Continuation of application No. PCT/JP2021/000883, filed on Jan. 13, 2021.

(30) Foreign Application Priority Data

Jan. 17, 2020  (JP) ................................ 2020-006022

(51) Int. Cl.
*H01M 10/0587*  (2010.01)
*H01M 10/0525*  (2010.01)
*H01M 50/414*  (2021.01)

(52) U.S. Cl.
CPC ... *H01M 10/0587* (2013.01); *H01M 10/0525* (2013.01); *H01M 50/414* (2021.01)

(58) Field of Classification Search
CPC ........... H01M 10/0587; H01M 50/414; H01M 10/0525
See application file for complete search history.

(56) References Cited

U.S. PATENT DOCUMENTS 9,368,776 B2  6/2016  Horikawa et al.
10,181,587 B2  1/2019  Ota et al.
(Continued)

FOREIGN PATENT DOCUMENTS

EP  2980910 B1 *  2/2018  .......... H01M 50/126
JP  S63121244  5/1988
(Continued)

OTHER PUBLICATIONS

JPH0340368964 MT (Year: 1991).*
(Continued)

*Primary Examiner* — Alexander Usyatinsky
(74) *Attorney, Agent, or Firm* — JCIPRNET (57) ABSTRACT A non-aqueous electrolyte secondary battery including a positive electrode having a positive electrode collector and a positive electrode active material layer in contact with the positive electrode collector; and a negative electrode having a negative electrode collector, and a negative electrode active material layer in contact with the negative electrode collector. The negative and the positive electrode collector, each having a resin film and a conductive layer disposed on one surface of the resin film. A separator disposed between the positive electrode and the negative electrode. A periphery of the resin films of the positive electrode collector and the negative electrode collector are superimposed and welded to each other. An inside surrounded by the resin films contains a non-aqueous electrolyte. A collector the non-aqueous electrolyte secondary battery. A method for manufacturing the non-aqueous electrolyte secondary battery and a method for manufacturing the collector.

15 Claims, 1 Drawing Sheet

(56) References Cited

U.S. PATENT DOCUMENTS

| | | | |
|---|---|---|---|
| 10,950,910 B2 | 3/2021 | Furutani et al. | |
| 11,024,903 B2 | 6/2021 | Ota et al. | |
| 2013/0122347 A1* | 5/2013 | Horikawa | H01M 6/005 |
| | | | 429/163 |
| 2013/0323566 A1 | 12/2013 | Morikawa et al. | |
| 2019/0067680 A1* | 2/2019 | Ohsawa | H01M 4/66 |
| 2019/0221824 A1* | 7/2019 | Tsuji | H01M 50/107 |
| 2022/0085440 A1 | 3/2022 | Ota et al. | |

FOREIGN PATENT DOCUMENTS

| | | | |
|---|---|---|---|
| JP | 63168964 | * | 7/1988 |
| JP | S63168964 | | 7/1988 |
| JP | H0340368 | | 2/1991 |
| JP | H0340368964 | * | 2/1991 |
| JP | 2734656 | | 4/1998 |
| JP | 2018524759 | | 8/2018 |
| JP | 2019057473 | | 4/2019 |
| WO | 2012002358 | | 1/2012 |
| WO | 2013027306 | | 2/2013 |
| WO | 2018056307 | | 3/2018 |

OTHER PUBLICATIONS

JP 63168964 MT (Year: 1988).*
Decision of JPO to grant a Patent for Application JP2021571210 (Year: 2023).*
Office Action of Japan Counterpart Application, with English translation thereof, issued on Jun. 13, 2023, pp. 1-5.
"Search Report of Europe Counterpart Application", issued on Aug. 20, 2024, pp. 1-9.
Office Action of Japan Counterpart Application, with English translation thereof, issued on Feb. 7, 2023, pp. 1-4.
"International Search Report (Form PCT/ISA/210) of PCT/JP2021/000883," mailed on Mar. 23, 2021, with English translation thereof, pp. 1-5.
"Written Opinion of the International Searching Authority (Form PCT/ISA/237)" of PCT/JP2021/000883, mailed on Mar. 23, 2021, with English translation thereof, pp. 1-6.
"Office Action of Korea Counterpart Application", issued on Nov. 14, 2024, with English translation thereof, pp. 1-13.
"Office Action of China Counterpart Application", issued on Nov. 3, 2025, with English translation thereof, pp. 1-15.

* cited by examiner

NON-AQUEOUS ELECTROLYTE SECONDARY BATTERY, COLLECTOR, METHOD FOR MANUFACTURING NON-AQUEOUS ELECTROLYTE SECONDARY BATTERY, AND METHOD FOR MANUFACTURING COLLECTOR

CROSS-REFERENCE TO RELATED APPLICATIONS

This application is a Continuation of PCT International Application No. PCT/JP2021/000883 filed on Jan. 13, 2021, which claims priority under 35 U.S.C. § 119 (a) to Japanese Patent Application No. 2020-006022 filed in Japan on Jan. 17, 2020. Each of the above applications is hereby expressly incorporated by reference, in its entirety, into the present application.

BACKGROUND OF THE INVENTION

1. Field of the Invention

The present invention relates to a non-aqueous electrolyte secondary battery, a collector, a method for manufacturing a non-aqueous electrolyte secondary battery, and a method for manufacturing a collector.

2. Description of the Related Art

A non-aqueous electrolyte secondary battery represented by a lithium-ion secondary battery exhibits high energy density, excellent storage performance, excellent low-temperature operability, and the like and is widely used in a portable electronic apparatus such as a cellular phone or a notebook computer. In addition, a battery has been increased in size so that the battery can be used in a transportation apparatus such as an automobile, and the battery can be used as a storage device for night-time electric power or electric power generated by natural energy power generation.

It is being studied to improve the performance of the non-aqueous electrolyte secondary battery by improving a collector. For example, JP2018-524759A describes a negative electrode collector having a multi-layer structure in which copper metal plating layers are formed on both surfaces of a plastic thin film through adhesive reinforcement layers, and antioxidant layers are provided on the surfaces of these copper metal plating layers. According to the technique described in JP2018-524759A, it is said that application of this negative electrode collector to a non-aqueous electrolyte secondary battery makes it possible to improve the energy density, to suppress falling off of the copper metal plating layer, to suppress oxidation of the copper metal plating layer, and to form the copper metal plating layer into a thin film, which leads to cost reduction.

SUMMARY OF THE INVENTION

Considering the usage environment of a non-aqueous electrolyte secondary battery (installation in transportation equipment such as an automobile, or outdoor use), the non-aqueous electrolyte secondary battery is required to have characteristics that can sufficiently maintain the battery performance even in a case where the battery is stored at a high temperature. However, in a case where the battery is stored at a high temperature, a battery cell expands due to the influence of a gas or the like generated from an electrolytic solution or the like, which is likely to lead to damage or misregistration of battery elements, resulting in deterioration of battery performance.

In addition, the non-aqueous electrolyte secondary battery is strongly required to have longer battery performance (improved cycle characteristics) since the battery is used by repeated charge and discharge. However, while the number of repetitions (number of cycles) of charge and discharge reaches several hundred times, a gas is gradually generated and an active material expands and contracts with charge and discharge, which repeatedly affects battery elements. This leads to damage or misregistration of the battery elements and then makes it difficult to sustain battery performance at a sufficiently high level.

An object of the present invention is to provide a non-aqueous electrolyte secondary battery whose battery performance does not easily deteriorate even upon long-term storage at a high temperature and which has excellent cycle characteristics. Another object of the present invention is to provide a collector which is suitable for use in the non-aqueous electrolyte secondary battery. Another object of the present invention to provide a method for manufacturing the non-aqueous electrolyte secondary battery, and a method for manufacturing the collector.

The present inventors have focused on the structure of the collector and attempted to achieve the above objects. As a result, it has been found that, in a case where a collector in which an ultra-thin layered conductive layer having a specific range of thickness is fixed onto a resin film is applied as a collector of a non-aqueous electrolyte secondary battery, and then the resin films constituting each collector of a positive electrode and a negative electrode are welded to each other and a non-aqueous electrolyte is enclosed inside the resin films, the obtained non-aqueous electrolyte secondary battery can be stored at a high temperature for a long period of time without deterioration of battery performance and can have excellent cycle characteristics.

The present invention has been further studied and completed based on these findings.

The foregoing objects have been achieved by the following means.

[1]
A non-aqueous electrolyte secondary battery including:
a positive electrode having a positive electrode collector which has a resin film and a conductive layer disposed on one surface of the resin film, and a positive electrode active material layer in contact with the positive electrode collector;
a negative electrode having a negative electrode collector which has a resin film and a conductive layer disposed on one surface of the resin film, and a negative electrode active material layer in contact with the negative electrode collector; and
a separator disposed between the positive electrode and the negative electrode,
in which the conductive layer of at least one of the positive electrode collector or the negative electrode collector has a thickness of 10 to 1,000 nm, and the conductive layer is fixed to the resin film, and
a periphery of the resin film of the positive electrode collector and a periphery of the resin film of the negative electrode collector are superimposed and welded to each other, and an inside surrounded by the resin films contains a non-aqueous electrolyte.

[2]

The non-aqueous electrolyte secondary battery according to [1], in which a thickness of the resin film to which the conductive layer having a thickness of 10 to 1,000 nm is fixed is 20 µm or less.

[3]

The non-aqueous electrolyte secondary battery according to [1] or [2], in which an electron conductivity at an interface with the conductive layer of the resin film to which the conductive layer having a thickness of 10 to 1,000 nm is fixed is $1 \times 10^5$ S/m or less.

[4]

The non-aqueous electrolyte secondary battery according to any one of [1] to [3], in which the conductive layer of the positive electrode collector contains aluminum, and the conductive layer of the negative electrode collector contains at least one selected from copper and nickel.

The non-aqueous electrolyte secondary battery according to any one of [1] to [4], in which the conductive layer having a thickness of 10 to 1,000 nm fixed to the resin film is a vapor-deposited film.

[6]

A collector including a resin film and a conductive layer fixed to one surface of the resin film, in which a thickness of the conductive layer is 10 to 1,000 nm.

[7]

The collector according to [6], in which a thickness of the resin film is 20 µm or less.

[8]

The collector according to [6] or [7], in which the conductive layer is a vapor-deposited film.

[9]

The collector according to any one of [6] to [8], in which the conductive layer is not disposed on the periphery of the resin film.

[10]

A method for manufacturing a non-aqueous electrolyte secondary battery, including:

disposing the collector according to any one of [6] to [9] as at least one collector of a positive electrode collector or a negative electrode collector.

[11]

The method for manufacturing a non-aqueous electrolyte secondary battery according to [10], in which the method includes disposing the collector according to any one of [6] to [9] as the positive electrode collector and the negative electrode collector.

[12]

The method for manufacturing a non-aqueous electrolyte secondary battery according to [11], in which the method includes superimposing and welding a periphery of the resin film of the positive electrode collector and a periphery of the resin film of the negative electrode collector to enclose a non-aqueous electrolyte in an inside surrounded by the resin films.

[13]

A method for manufacturing a collector for a secondary battery, including:

forming a conductive layer having a thickness of 10 to 1,000 nm on one surface of a resin film by vapor deposition or plating on a portion excluding a periphery of the resin film.

In the description of the present invention, any numerical range expressed by using "to" means a range including the numerical values before and after the "to" as a lower limit value and an upper limit value, respectively.

The "non-aqueous electrolyte" in the present invention means an electrolyte that contains substantially no water. That is, the "non-aqueous electrolyte" may contain a small amount of water as long as the effect of the present invention is not impaired. The "non-aqueous electrolyte" in the present invention has a water concentration of 200 ppm (mass basis) or less, preferably 100 ppm or less, and more preferably 20 ppm or less. It is practically difficult to make the non-aqueous electrolyte completely anhydrous, and the non-aqueous electrolyte usually contains 0.1 ppm or more of water.

The "non-aqueous electrolyte" in the present invention includes a non-aqueous electrolytic solution having ionic conductivity such as a lithium ion, a solid electrolyte, and the like.

The "non-aqueous electrolyte secondary battery" in the present invention broadly includes a secondary battery using a non-aqueous electrolyte.

The non-aqueous electrolyte secondary battery according to an aspect of the present invention does not easily deteriorate in battery performance even upon long-term storage at a high temperature and has excellent cycle characteristics.

The collector according to the aspect of the present invention is suitable as a collector of the non-aqueous electrolyte secondary battery according to the aspect of the present invention.

According to the method for manufacturing a non-aqueous electrolyte secondary battery according to the aspect of the present invention, it is possible to obtain a non-aqueous electrolyte secondary battery whose battery performance does not easily deteriorate even upon long-term storage at a high temperature and which has excellent cycle characteristics.

According to the method for manufacturing a collector according to the aspect of the present invention, it is possible to obtain a collector suitable for use in the non-aqueous electrolyte secondary battery according to the aspect of the present invention.

DESCRIPTION OF THE PREFERRED EMBODIMENTS

Preferred embodiments of the non-aqueous electrolyte secondary battery according to the embodiment of the present invention will be described, but the present invention is not limited to these embodiments except as specified in the present invention.

[Non-Aqueous Electrolyte Secondary Battery]

The non-aqueous electrolyte secondary battery according to the embodiment of the present invention has a configuration including a positive electrode, a negative electrode, and a separator disposed between the positive electrode and the negative electrode. The positive electrode has a positive electrode collector and a positive electrode active material layer in contact with the positive electrode collector, and the negative electrode has a negative electrode collector and a negative electrode active material layer in contact with the negative electrode collector.

In the non-aqueous electrolyte secondary battery according to the embodiment of the present invention, both the positive electrode collector and the negative electrode collector have a resin film and a conductive layer disposed on one surface of the resin film, at least one of the positive electrode collector or the negative electrode collector has a conductive layer having a thickness of 10 to 1,000 nm, and the conductive layer of the at least one of the positive electrode collector or the negative electrode collector is fixed to the resin film surface.

In the present invention, the fact that the conductive layer is "fixed" to the resin film means that the conductive layer is not simply disposed on the resin film but is immobilized on the resin film surface. That is, it does not mean a form in which a metal foil is disposed on the resin film, but a state in which the conductive layer is bonded to the resin film by vapor deposition, plating, or the like. Above all, the conductive layer is preferably a vapor-deposited film formed by vapor deposition.

In the present invention, the thickness of each layer such as the constituent layer of the non-aqueous electrolyte secondary battery and the constituent layer of the collector is a value obtained by measuring thicknesses at 100 random points in the cross-sectional observation (electron microscope observation) of each layer in a lamination direction, and then arithmetically averaging the measured values of those 100 points.

In the non-aqueous electrolyte secondary battery according to the embodiment of the present invention, a periphery of the resin film of the positive electrode collector and a periphery of the resin film of the negative electrode collector are superimposed and welded to each other, and the inside surrounded by these resin films contains a non-aqueous electrolyte. That is, it is preferable that neither the positive electrode collector nor the negative electrode collector used in the non-aqueous electrolyte secondary battery according to the embodiment of the present invention has a conductive layer disposed on the periphery of the resin film. This leads to a state in which the periphery of the resin film of the positive electrode collector and the periphery of the resin film of the negative electrode collector can be directly superimposed with each other.

The "periphery" of the resin film in the present invention means an outer periphery of the resin film surface and its vicinity. Preferably, a width of a "peripheral" portion of the resin film is 1 to 50 mm.

The non-aqueous electrolyte secondary battery according to the embodiment of the present invention can adopt the configuration of a normal non-aqueous electrolyte secondary battery except for the configuration of the collector and the enclosing of an electrolytic solution by the welding of the resin film constituting the collector. First, the operating principle of a conventional general non-aqueous electrolyte secondary battery will be described.

Figure 1:
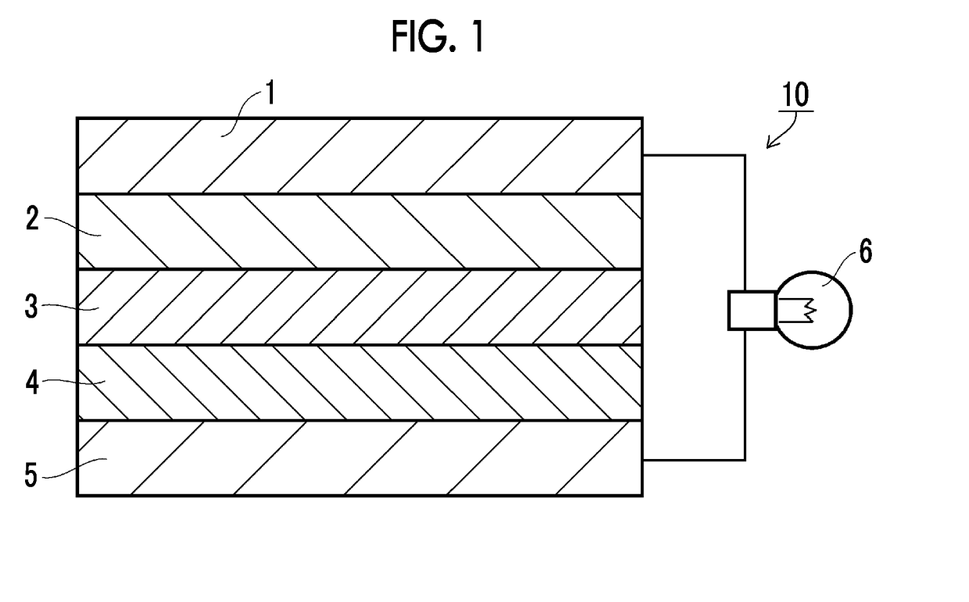
FIG. 1 is a vertical cross-sectional view schematically showing a basic laminated configuration of a non-aqueous electrolyte secondary battery.

FIG. 1 is a cross-sectional view schematically showing a laminated structure of a general non-aqueous electrolyte secondary battery 10, including an operating electrode at the time of operating as a battery. The non-aqueous electrolyte secondary battery 10 has a laminated structure having a negative electrode collector 1, a negative electrode active material layer 2, a separator 3, a positive electrode active material layer 4, and a positive electrode collector 5 in this order in a case of being viewed from the negative electrode side. The space between the negative electrode active material layer and the positive electrode active material layer is filled with a non-aqueous electrolyte (not shown), and the two electrode active material layers are separated from each other by the separator 3. The separator 3 has holes and functions as a positive electrode/negative electrode separation film that insulates between the positive electrode and the negative electrode while allowing an electrolyte and ions to pass therethrough in a normal battery use state. With such a structure, for example, in a case of a lithium ion secondary battery, electrons (e) are supplied to the negative electrode side through an external circuit at the time of battery charge, and at the same time, lithium ions ($Li^+$) move from the positive electrode through an electrolytic solution and are accumulated in the negative electrode. On the other hand, at the time of battery discharge, the lithium ions ($Li^+$) accumulated in the negative electrode are returned to the positive electrode side through the electrolyte, and electrons are supplied to an operating portion 6. In the illustrated example, a light bulb is used for the operating portion 6, and the light bulb is turned on by battery discharge. The separator 3 may be formed of a solid electrolyte.

In the present invention, the negative electrode collector 1 and the negative electrode active material layer 2 are collectively referred to as a negative electrode, and the positive electrode active material layer 4 and the positive electrode collector 5 are collectively referred to as a positive electrode.

Subsequently, a preferred form of the laminated structure of the non-aqueous electrolyte secondary battery according to the embodiment of the present invention will be described.

Figure 2:
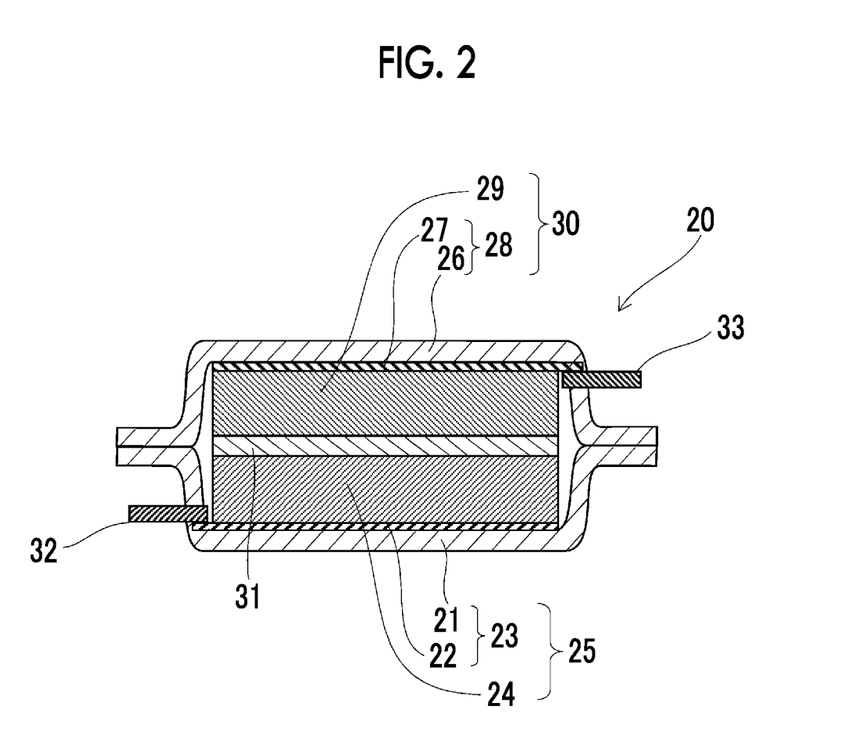
FIG. 2 is a vertical cross-sectional view schematically showing an embodiment of a non-aqueous electrolyte secondary battery of the present invention.

As shown in FIG. 2, a non-aqueous electrolyte secondary battery 20 according to the embodiment of the present invention is configured such that a negative electrode 25 consisting of a negative electrode collector 23 having a resin film 21 and a conductive layer 22 disposed on one surface of the resin film 21, and a negative electrode active material layer 24 disposed in contact with the negative electrode collector 23 and a positive electrode 30 consisting of a positive electrode collector 28 having a resin film 26 and a conductive layer 27 disposed on one surface of the resin film 26, and a positive electrode active material layer 29 disposed in contact with the positive electrode collector 28 are laminated so as to face each other with a separator 31 interposed therebetween.

Tabs (conductive wiring lines for connecting an electrode to an external circuit) 32 and 33 are connected to the conductive layer 22 of the negative electrode collector 23 and the conductive layer 27 of the positive electrode collector 28, respectively.

The conductive layer 22 is not present on the periphery of the surface of the resin film 21 on which the conductive layer 22 is disposed and therefore, before the preparation of the non-aqueous electrolyte secondary battery, the surface of the resin film 21 is exposed on the periphery of the resin film 21 of the negative electrode collector 23. In addition, the conductive layer 27 is not present on the periphery of the surface of the resin film 26 on which the conductive layer 27 is disposed and therefore, before the preparation of the non-aqueous electrolyte secondary battery, the surface of the resin film 26 is exposed on the periphery of the resin film 26 of the positive electrode collector 28. The exposed portion may be provided with an easily peelable mask or the like before welding.

Therefore, in the non-aqueous electrolyte secondary battery according to the embodiment of the present invention, as shown in FIG. 2, the periphery of the resin film 21 and the periphery of the resin film 26 can be directly superposed (if necessary, the mask or the like is peeled off and then the peripheries of the resin films are superposed) and welded. By this welding, an electrolyte (not shown) can be contained in the inside surrounded by these resin films, so a non-aqueous electrolyte secondary battery can be obtained. The welding can be carried out by, for example, heat, ultrasonic waves, or the like, and heat welding is preferable.

In the form of FIG. 2, the conductive layer of at least one of the positive electrode collector or the negative electrode collector has a thickness of 10 to 1,000 nm, and the conductive layer is fixed to the resin film. The collector in which a conductive layer having a thickness of 10 to 1,000 nm is fixed to a resin film is referred to as a "collector (Z)" in the present specification.

In the non-aqueous electrolyte secondary battery according to the embodiment of the present invention, it is preferable that both the positive electrode collector and the negative electrode collector are the collectors (Z).

The materials, electrolytic solutions, members, and the like used in the non-aqueous electrolyte secondary battery according to the embodiment of the present invention are not particularly limited except for the configuration of the collector. As these materials, members, and the like, those used for a normal non-aqueous electrolyte secondary battery can be appropriately applied. In addition, as the method for manufacturing the non-aqueous electrolyte secondary battery according to the embodiment of the present invention, a normal method can be appropriately adopted except for the configuration of the collector and the enclosing of a non-aqueous electrolyte by the welding of the resin film constituting the collector. For example, JP2016-201308A, JP2005-108835A, and JP2012-185938A can be appropriately referred to.

The collector (Z), which is a characteristic configuration of the non-aqueous electrolyte secondary battery according to the embodiment of the present invention, will be described below.

<Collector (Z)>

—Resin Film—

The constituent material of the resin film is not particularly limited, and a resin having electron-insulating properties can be suitably used. Examples of the resin having electron-insulating properties include a polyester resin, a polyolefin resin, a polyimide resin, a polytetrafluoroethylene resin, and a polyvinylidene fluoride resin. It is preferable to use one or two or more of a polyester resin and a polyolefin resin. It is more preferable to use a polyolefin resin from the viewpoint of ease of welding.

Examples of the polyolefin resin include low-density polyethylene, linear low-density polyethylene, medium-density polyethylene, high-density polyethylene, ultra-low-density polyethylene, random copolymerized polypropylene, block copolymerized polypropylene, homopolypropylene, polybutene, polymethylpentene, an ethylene-vinyl acetate copolymer, an ionomer resin, an ethylene-(meth)acrylic acid copolymer, an ethylene-(meth)acrylic acid ester copolymer, an ethylene-butene copolymer, and an ethylene-hexene copolymer. Among these polyolefin resins, polyethylene or polypropylene is preferable, and polyethylene is more preferable.

The resin film may have a monolayer structure or a multi-layer structure. In a case where the resin film has a multi-layer structure, for example, the layer located on the electrode active material layer side (the positive electrode active material layer side or the negative electrode active material layer side, which is synonymous with the conductive layer side) can be a polyolefin resin. This makes it possible to superimpose the polyolefin resins and weld the polyolefin resins under milder conditions.

For example, the resin film can have a laminated structure of a polyester resin and a polyethylene resin, and at the final stage of battery preparation, the periphery of the polyethylene resin layer constituting the resin film of the positive electrode collector and the periphery of the polyethylene resin layer constituting the resin film of the negative electrode collector are superimposed with each other and heat-sealed (heat-welded), whereby it is possible to obtain a non-aqueous electrolyte secondary battery in which an electrolytic solution is enclosed. That is, the resin film can have a battery sealing function.

The thickness of the resin film can be appropriately set as long as the effect of the present invention is not impaired. From the viewpoint of improving storage characteristics and cycle characteristics, the thickness of the resin film can be, for example, 50 μm or less and is more preferably 40 μm or less, still more preferably 30 μm or less, even still more preferably 25 μm or less, and particularly preferably 20 μm or less. The thickness of the resin film is usually 1 μm or more, may be 2 μm or more, and is also preferably 5 μm or more and more preferably 7 μm or more.

The electron conductivity at the interface of the resin film with the conductive layer is preferably $1\times10^5$ S (siemens)/m or less. In addition, it is preferable that the entire resin film has an electron conductivity of $1\times10^5$ S/m or less. This electron conductivity is a value at a temperature of 25° C.

—Conductive Layer—

The conductive layer is a layer exhibiting electron conductivity, and is usually composed of a metal material. The metal material is not particularly limited, and a known metal material applicable to a collector of a non-aqueous electrolyte secondary battery can be widely applied.

In a case where the collector (Z) is used as the positive electrode collector, the conductive layer preferably contains aluminum, and is more preferably composed of aluminum or an aluminum alloy. In a case where the collector (Z) is a positive electrode collector, the conductive layer may be configured to contain a metal material such as titanium, stainless steel, or nickel, or an alloy thereof.

In a case where the collector (Z) is used as the negative electrode collector, the conductive layer preferably contains at least one of copper or nickel, and is more preferably composed of copper or a copper alloy, or nickel or a nickel alloy.

The conductive layer is preferably formed into a thin layer having a thickness of 10 to 1,000 nm by vapor deposition (preferably physical vapor deposition), sputtering, plating (preferably electroless plating), or the like. From the viewpoint of improving storage stability and cycle characteristics, the thickness of the conductive layer is preferably 100 to 900 nm, more preferably 120 to 800 nm, still more preferably 150 to 800 nm, even still more preferably 200 to 700 nm, and particularly preferably 250 to 650 nm.

In addition, the thickness of the conductive layer is also preferably 100 to 1,000 nm, more preferably 200 to 1,000 nm, and still more preferably 300 to 1,000 nm.

In a case where the thickness of the conductive layer of the negative electrode collector is constant in each battery, the cycle characteristics can be further enhanced by setting the thickness of the conductive layer 22 of the positive electrode collector to 150 to 800 nm (preferably 200 to 700 nm and more preferably 250 to 650 nm).

Similarly, in a case where the thickness of the conductive layer of the positive electrode collector is constant in each battery, the cycle characteristics can be further enhanced by setting the thickness of the conductive layer 22 of the negative electrode collector to 150 to 800 nm (preferably 200 to 700 nm and more preferably 250 to 650 nm).

The non-aqueous electrolyte secondary battery according to the embodiment of the present invention can be manufactured by a conventional method except that the above-mentioned collector (Z) is disposed as at least one of the positive electrode collector or the negative electrode collector, and the peripheries of the resin films of both collectors are superimposed and welded to each other and a non-aqueous electrolyte is enclosed in the inside surrounded by the resin films. In a case where both the positive electrode collector and the negative electrode collector are the collectors (Z) in the non-aqueous electrolyte secondary battery according to the embodiment of the present invention, the positive electrode collector and the negative electrode collector may be the same as or different from each other. In a case where both the positive electrode collector and the negative electrode collector are the collectors (Z), for example, it is also preferable that the conductive layer of the positive electrode collector and the conductive layer of the negative electrode collector are composed of different metal materials. The preferred constituent materials for each conductive layer of the positive electrode and the negative electrode are as described above.

The resin film to which a conductive layer is fixed also functions as a battery sealing film (a film for enclosing a non-aqueous electrolyte) in the non-aqueous electrolyte secondary battery according to the embodiment of the present invention, so the laminated structure of the battery elements is less likely to be displaced due to pressure rise during high temperature storage of the battery and swelling and contraction of the active material resulting from repeated charge and discharge, and therefore the battery can stably and sustainably exhibit the desired battery performance.

In the non-aqueous electrolyte secondary battery according to the embodiment of the present invention, in a case where the positive electrode collector or the negative electrode collector is not composed of the collector (Z), the configuration of the positive electrode collector or the negative electrode collector that is not the collector (Z) is not particularly limited as long as the collector has a conductive layer on the surface of a resin film as a support, and this resin film can be welded to the resin film of the collector (Z). The preferred form of the resin film of the positive electrode collector or the negative electrode collector that is not the collector (Z) is the same as the preferred form of the resin film described in the collector (Z). In addition, the conductive layer of the positive electrode collector or the negative electrode collector that is not the collector (Z) can be a metal foil, a vapor-deposited film having a thickness of more than 1,000 nm, or the like.

Although the metal foil is not fixed to the resin film, the effect of the present invention can be enjoyed in a case where the other collector is the collector (Z), as compared with a case where both collectors are metal foils. This also applies in a case where the conductive layer of the positive electrode collector or the negative electrode collector is a vapor-deposited film having a thickness of more than 1,000 nm.

The non-aqueous electrolyte secondary battery according to the embodiment of the present invention can be mounted on an electronic apparatus such as a notebook computer, a pen input computer, a mobile computer, an electronic book player, a cellular phone, a cordless phone handset, a pager, a handy terminal, a portable fax, a portable copier, a portable printer, a stereo headphone, a video movie player, a liquid crystal display TV, a handy cleaner, a portable CD player, a mini disc player, an electric shaver, a transceiver, an electronic organizer, a calculator, a memory card, a portable tape recorder, a radio, or a backup power supply. In addition, for consumer use, the non-aqueous electrolyte secondary battery according to the embodiment of the present invention can be mounted on an automobile, an electric vehicle, a motor, a lighting instrument, a toy, a game instrument, a road conditioner, a watch, a strobe, a camera, or a medical instrument (a pacemaker, a hearing aid, a shoulder massage machine, or the like). Furthermore, the non-aqueous electrolyte secondary battery according to the embodiment of the present invention can be used for various military needs and space use. In addition, the non-aqueous electrolyte secondary battery according to the embodiment of the present invention can also be combined with a solar battery.

Hereinafter, the present invention will be described in more detail based on examples. It should be noted that the present invention is not limited thereto.

EXAMPLES

Example 1

<Preparation of Non-Aqueous Electrolyte>

$LiPF_6$ as a lithium salt was dissolved in a non-aqueous solvent of ethylene carbonate/ethylmethyl carbonate=½ (mass ratio) to a concentration of 1 M to prepare a non-aqueous electrolytic solution.

<Preparation of Slurry for Forming Positive Electrode Active Material Layer>

A slurry containing 85 parts by mass of lithium iron phosphate ($LiFePO_4$, also referred to as LFP) as a positive electrode active material, 10 parts by mass of acetylene black as a conductive auxiliary agent, and 5 parts by mass of polyvinylidene fluoride (PVDF) as a binder was prepared and used as a slurry for forming a positive electrode active material layer.

Specifically, PVDF was dissolved in N-methylpyrrolidone (NMP) at a concentration of 8% by mass, and 3.6 g of acetylene black was added to 22.5 g of the obtained solution, followed by mixing at 2,000 rpm for 3 minutes using a rotating and revolving mixer (trade name: Awatori Rentaro ARE-310, manufactured by Thinky Corporation). 16 g of NMP and 30 g of lithium iron phosphate were added thereto, followed by mixing at 2,000 rpm for 3 minutes, and 18 g of NMP was further added thereto, followed by mixing at 2,000 rpm for 3 minutes to obtain a slurry for forming a positive electrode active material layer.

<Preparation of Slurry for Forming Negative Electrode Active Material Layer>

A slurry containing 95 parts by mass of graphite (artificial graphite) as a negative electrode active material, 3 parts by mass of styrene/butadiene rubber (SBR) as a binder, and 2 parts by mass of carboxymethyl cellulose (CMC) was prepared and used as a slurry for forming a negative electrode active material layer.

Specifically, 40 g of graphite was added to 40 g of a 1.5% by mass CMC aqueous solution, followed by mixing at 2,000 rpm for 3 minutes using a rotating and revolving mixer (trade name: Awatori Rentaro ARE-310, manufactured by Thinky Corporation). 18.7 g of a 1.5% by mass CMC aqueous solution and 20 g of pure water were added thereto, followed by mixing at 2,000 rpm for 3 minutes, and 3 g of a 40% by mass SBR dispersion liquid (solvent: water) was further added thereto, followed by mixing at 2,000 rpm for 3 minutes to obtain a slurry for forming a negative electrode active material layer.

<Separator>

A polypropylene separator (film thickness: 20 μm, void volume: 48%, pore diameter: 30 nm) was used.

<Preparation of Non-Aqueous Electrolyte Secondary Battery>

The non-aqueous electrolyte secondary battery shown in FIG. 2 was prepared.

—Preparation of Positive Electrode Collector—

Using a polyethylene resin film (electron conductivity: $1\times10^5$ S/m or less) having a thickness of 15 μm, a length of 80 mm, and a width of 80 mm as the resin film, the periphery (width: 10 mm) of the conductive layer forming surface of this film was masked with a polyimide tape, and then aluminum was fixed on this surface by a physical vapor deposition method so as to have a thickness of 1 μm to form a conductive layer. In this manner, a positive electrode collector was obtained.

—Preparation of Positive Electrode—

The slurry for forming a positive electrode active material layer was applied onto the aluminum conductive layer of the positive electrode collector obtained above and dried to form a positive electrode active material layer having a thickness of 100 μm. Then, the polyimide tape was peeled off to obtain a positive electrode.

—Preparation of Negative Electrode Collector—

Using a polyethylene resin film (electron conductivity: $1\times10^5$ S/m or less) having a thickness of 15 μm, a length of 85 mm, and a width of 85 mm as the resin film, the periphery (width: 10 mm) of the conductive layer forming surface of this film was masked with a polyimide tape, and then copper was fixed on this surface by a physical vapor deposition method so as to have a thickness of 1 μm to form a conductive layer. In this manner, a negative electrode collector was obtained.

—Preparation of Negative Electrode—

The slurry for forming a negative electrode active material layer was applied onto the copper conductive layer of the negative electrode collector obtained above and dried to form a negative electrode active material layer having a thickness of 100 μm. Then, the polyimide tape was peeled off to obtain a negative electrode.

—Preparation of Non-Aqueous Electrolyte Secondary Battery—

The obtained positive electrode and negative electrode were laminated through the separator so that the active material layers faced each other, and a wiring line (tab) was connected to the conductive layer of each collector and the wiring line was pulled out. The electrolytic solution was impregnated between the positive electrode and the negative electrode, and the periphery of the polyethylene resin film of the positive electrode collector and the periphery of the polyethylene resin film of the negative electrode collector were superimposed and heat-welded to each other. In this manner, a non-aqueous electrolyte secondary battery containing an electrolytic solution inside surrounded by welding of two polyethylene resin films was obtained.

The obtained non-aqueous electrolyte secondary battery was charged and discharged once at 25° C. by charge at a current value of 25 mA and a final voltage of 3.6 V and then discharge at a current value of 25 mA and a final voltage of 2.0 V, and used in the test examples which will be given later.

Example 2, Example 3, Example 4, and Example 5

Non-aqueous electrolyte secondary batteries used in the test examples which will be given later were obtained in the same manner as in Example 1 except that, in the preparation of the positive electrode collector of Example 1, the thickness of the conductive layer formed by physical vapor deposition of aluminum was as shown in the table which will be given later.

Example 6 and Example 7

Non-aqueous electrolyte secondary batteries used in the test examples which will be given later were obtained in the same manner as in Example 1 except that, in the preparation of the negative electrode collector of Example 1, the thickness of the conductive layer formed by physical vapor deposition of copper was as shown in the table which will be given later.

Example 8

A non-aqueous electrolyte secondary battery used in the test examples which will be given later was obtained in the same manner as in Example 1 except that, in the preparation of the negative electrode collector of Example 1, the conductive layer was formed by physical vapor deposition of nickel.

Example 9, Example 10, Example 11, and Example 12

Non-aqueous electrolyte secondary batteries used in the test examples which will be given later were obtained in the same manner as in Example 8 except that, in the preparation of the positive electrode collector of Example 8, the thickness of the conductive layer formed by physical vapor deposition of aluminum was as shown in the table which will be given later.

Example 13

A non-aqueous electrolyte secondary battery used in the test examples which will be given later was obtained in the same manner as in Example 1 except that, in the preparation of the slurry for forming a positive electrode active material layer of Example 1, $LiNi_{0.5}Co_{0.2}Mn_{0.3}O_2$ (NCM523) was used as the positive electrode active material.

Example 14

A non-aqueous electrolyte secondary battery used in the test examples which will be given later was obtained in the same manner as in Example 1 except that, in the preparation of the positive electrode collector of Example 1, a polyethylene resin film having a thickness of 50 μm (electron conductivity: $1\times10^5$ S/m or less) was used as the resin film.

Example 15

A non-aqueous electrolyte secondary battery used in the test examples which will be given later was obtained in the same manner as in Example 1 except that, in the preparation of the negative electrode collector of Example 1, the conductive layer was formed by electroless plating of nickel.

Example 16

Non-aqueous electrolyte secondary batteries used in the test examples which will be given later were obtained in the same manner as in Example 1 except that, in the preparation of the negative electrode collector of Example 1, the thickness of the conductive layer formed by physical vapor deposition of copper was as shown in the table which will be given later.

Comparative Example 1

An aluminum foil having a thickness of 20 μm was used as a positive electrode collector, and the slurry for forming a positive electrode active material layer was applied onto the positive electrode collector and dried to form a positive electrode active material layer having a thickness of 100 μm to thereby obtain a positive electrode.

In addition, a copper foil having a thickness of 18 μm was used as a negative electrode collector, and the slurry for forming a negative electrode active material layer was applied onto the negative electrode collector and dried to form a negative electrode active material layer having a thickness of 100 μm to thereby obtain a negative electrode.

The obtained positive electrode and negative electrode were laminated through the separator so that the active material layers faced each other, and a wiring line (tab) was connected to the conductive layer of each collector and the wiring line was pulled out. The above electrolytic solution was impregnated between the positive electrode and the negative electrode, and the entire laminate was sealed from the outside of the positive electrode collector and the negative electrode collector using a polyethylene resin film (electron conductivity: $1 \times 10^5$ S/m or less) having a thickness of 15 μm to enclose the electrolytic solution, thereby obtaining a non-aqueous electrolyte secondary battery.

Then, charge and discharge were carried out in the same manner as in Example 1 to obtain a non-aqueous electrolyte secondary battery used in the test examples which will be given later.

Comparative Example 2

A non-aqueous electrolyte secondary battery used in the test examples which will be given later was obtained in the same manner as in Comparative Example 1 except that, in Comparative Example 1, one having a conductive layer formed by fixing aluminum to a thickness of 5 μm by physical vapor deposition on a polyethylene resin film (electron conductivity: $1 \times 10^5$ S/m or less) having a thickness of 15 μm was used as the positive electrode collector.

Test Example 1

Storage Characteristics Test

Using each of the non-aqueous electrolyte secondary batteries prepared above, the battery was charged at 25° C. and a current value of 50 mA and a final voltage of 3.6 V, and then discharged at a current value of 50 mA and a final voltage of 2.0 V. The discharge capacity at the time of this discharge was taken as a reference discharge capacity.

The battery was charged at 25° C. and a current value of 50 mA and a final voltage of 3.6 V. The charged battery was allowed to stand in a constant-temperature tank at 50° C. and left for 30 days. Then, the battery was transferred to a constant-temperature tank at 25° C., and the state of the battery was observed.

In addition, after the open circuit voltage (OCV) measurement was carried out on the battery transferred to the constant-temperature tank at 25° C., the battery was discharged to a final voltage of 2.0 V at a current value of 25 mA.

Next, the battery was charged at a current value of 50 mA and a final voltage of 3.6 V, and discharged at a current value of 50 mA and a final voltage of 2.0 V. From the discharge capacity at the time of this discharge (discharge capacity after storage), the discharge capacity retention rate (%) was calculated by the following expression.

The storage characteristics were evaluated by applying the calculated values to the following evaluation standards.

Discharge capacity retention rate (%)=100×[discharge capacity after storage]/[reference discharge capacity]

—Storage Characteristics Evaluation Standards (State of Battery)—

A: No change is observed in the state of the battery.
B: Almost no change is observed in the state of the battery.
C: The battery is clearly inflated, but no leakage of electrolytic solution is observed.
D: The battery is clearly inflated and leakage of electrolytic solution is also observed.

(Those with leakage of electrolytic solution are not attached to other storage characteristics tests.)

—Storage Characteristics Evaluation Standards (OCV)—

A: The OCV is 2 V or more
B: The OCV is 1.5 V or more and less than 2 V
C: The OCV is less than 1.5 V —Storage Characteristics Evaluation Standards (Discharge Capacity Retention Rate)—

A: The discharge capacity retention rate is 95% or more
B: The discharge capacity retention rate is 90% or more and less than 95%
C: The discharge capacity retention rate is 75% or more and less than 90%
D: The discharge capacity retention rate is 50% or more and less than 75%
E: The discharge capacity retention rate is less than 50%

The results are shown in the table which will be given later.

Test Example 2

Cycle Characteristics Test

Using each of non-aqueous electrolyte secondary batteries prepared above, the battery was charged at 25° C. and a current value of 50 mA and a final voltage of 3.6 V, and then discharged at a current value of 50 mA and a final voltage of 2.0 V. The discharge capacity at the time of this discharge was taken as a reference discharge capacity.

The battery was transferred to a constant-temperature tank at 35° C., and charge/discharge of the battery was repeated for 500 cycles with charge at a current value of 50 mA and a final voltage of 3.6 V and discharge at a current value of 50 mA and a final voltage of 2.0 V as one cycle. Thereafter, the battery was charged at 25° C. and a current value of 50 mA and a final voltage of 3.6 V, and then discharged at 25° C. and a current value of 50 mA and a final voltage of 2.0 V. From the discharge capacity at the time of this discharge (discharge capacity after 500 cycles), the discharge capacity retention rate (%) was calculated by the following expression. The cycle characteristics were evaluated by applying the calculated values to the following evaluation standards.

Discharge capacity retention rate (%)=100×[discharge capacity after 500 cycles]/[reference discharge capacity]

Evaluation Standards for Cycle Characteristics—
A: The discharge capacity retention rate is 90% or more
B: The discharge capacity retention rate is 80% or more and less than 90%
C: The discharge capacity retention rate is 60% or more and less than 80%
D: The discharge capacity retention rate is 50% or more and less than 60%
E: The discharge capacity retention rate is less than 50%

The results are shown in the table which will be given later.

TABLE 1

| | Positive electrode collector | | | | Positive | Negative electrode collector | | | | Negative | Storage characteristics | | | |
| | Resin film | | Conductive layer | | electrode | Resin film | | Conductive layer | | electrode | | | Discharge | |
| | Type | Thickness (µm) | Type | Thickness (nm) | active material | Type | Thickness (µm) | Type | Thickness (nm) | active material | State of battery | OCV | capacity retention rate | Cycle charac- teristics |
|---|---|---|---|---|---|---|---|---|---|---|---|---|---|---|
| Example 1 | PE | 15 | Al vapor-deposited | 1,000 | LFP | PE | 15 | Cu vapor-deposited | 1,000 | Graphite | B | B | B | B |
| Example 2 | PE | 15 | Al vapor-deposited | 600 | LFP | PE | 15 | Cu vapor-deposited | 1,000 | Graphite | A | A | A | A |
| Example 3 | PE | 15 | Al vapor-deposited | 300 | LFP | PE | 15 | Cu vapor-deposited | 1,000 | Graphite | A | A | A | A |
| Example 4 | PE | 15 | Al vapor-deposited | 200 | LFP | PE | 15 | Cu vapor-deposited | 1,000 | Graphite | A | B | B | B |
| Example 5 | PE | 15 | Al vapor-deposited | 100 | LFP | PE | 15 | Cu vapor-deposited | 1,000 | Graphite | A | B | B | C |
| Example 6 | PE | 15 | Al vapor-deposited | 1,000 | LFP | PE | 15 | Cu vapor-deposited | 600 | Graphite | A | A | A | A |
| Example 7 | PE | 15 | Al vapor-deposited | 1,000 | LFP | PE | 15 | Cu vapor-deposited | 300 | Graphite | A | A | A | A |
| Example 8 | PE | 15 | Al vapor-deposited | 1,000 | LFP | PE | 15 | Ni vapor-deposited | 1,000 | Graphite | B | B | B | B |
| Example 9 | PE | 15 | Al vapor-deposited | 600 | LFP | PE | 15 | | | | | | | |
| Example 10 | PE | 15 | Al vapor-deposited | 300 | LFP | PE | 15 | | | | | | | |
| Example 11 | PE | 15 | Al vapor-deposited | 200 | LFP | PE | 15 | | | | | | | |
| Example 12 | PE | 15 | Al vapor-deposited | 100 | LFP | PE | 15 | | | | | | | |
| Example 13 | PE | 15 | Al vapor-deposited | 1,000 | NCM | PE | 15 | | | | | | | |
| Example 14 | PE | 50 | Al vapor-deposited | 1,000 | LFP | PE | 15 | | | | | | | |
| Example 15 | PE | 15 | Al vapor-deposited | 1,000 | LFP | PE | 15 | | | | | | | |
| Example 16 | PE | 15 | Al vapor-deposited | 1,000 | LFP | PE | 15 | | | | | | | |
| Comparative Example 1 | PE | 15 | Al foil | 20,000 | LFP | PE | 15 | | | | | | | |
| Comparative Example 2 | PE | 15 | Al vapor-deposited | 5,000 | LFP | PE | 15 | | | | | | | |

TABLE 1-continued

| | | | | | | | |
|---|---|---|---|---|---|---|---|
| Example 9 | Ni vapor-deposited | 1,000 | Graphite | A | A | A | A |
| Example 10 | Ni vapor-deposited | 1,000 | Graphite | A | A | A | A |
| Example 11 | Ni vapor-deposited | 1,000 | Graphite | A | B | B | B |
| Example 12 | Ni vapor-deposited | 1,000 | Graphite | A | B | B | C |
| Example 13 | Cu vapor-deposited | 1,000 | Graphite | B | B | B | C |
| Example 14 | Cu vapor-deposited | 1,000 | Graphite | B | B | C | C |
| Example 15 | Ni plating | 1,000 | Graphite | C | B | C | C |
| Example 16 | Cu vapor-deposited | 2,000 | Graphite | C | B | C | C |
| Comparative Example 1 | Cu foil | 18,000 | Graphite | D | — | — | D |
| Comparative Example 2 | Cu foil | 18,000 | Graphite | D | — | — | E |

As shown in the above table, in the non-aqueous electrolyte secondary battery that does not use the collector (Z) for both the positive electrode and the negative electrode, the battery expanded, causing the electrolytic solution to leak in a case where the charged battery was stored at a high temperature for a long period of time. On the other hand, all of the non-aqueous electrolyte secondary batteries according to the embodiment of the present invention using the collector (Z) as a collector did not easily deteriorate in battery performance even in a case where the battery was stored at a high temperature for a long period of time, and had excellent cycle characteristics (Examples 1 to 16).

Although the present invention has been described with reference to embodiments thereof, it is considered that, unless otherwise specified, even the detailed description of the invention is not limited and should be broadly interpreted without departing from the spirit and scope of the invention shown in the attached "WHAT IS CLAIMED IS".

EXPLANATION OF REFERENCES

10: non-aqueous electrolyte secondary battery
1: negative electrode collector
2: negative electrode active material layer
3: separator
4: positive electrode active material layer
5: positive electrode collector
6: operation portion (light bulb)
20: non-aqueous electrolyte secondary battery
21, 26: resin film
22, 27: conductive layer
23: negative electrode collector
24: negative electrode active material layer
25: negative electrode
28: positive electrode collector
29: positive electrode active material layer
30: positive electrode
31: separator
32, 33: tab

What is claimed is:

1. A non-aqueous electrolyte secondary battery comprising:
a positive electrode having a positive electrode collector which has a resin film and a conductive layer disposed on one surface of the resin film, and a positive electrode active material layer in contact with the positive electrode collector;
a negative electrode having a negative electrode collector which has a resin film and a conductive layer disposed on one surface of the resin film, and a negative electrode active material layer in contact with the negative electrode collector; and
a separator disposed between the positive electrode and the negative electrode,
wherein the conductive layer of at least one of the positive electrode collector or the negative electrode collector has a thickness of 250 nm to 650 nm, and the conductive layer is fixed to the resin film, and
a periphery of the resin film of the positive electrode collector and a periphery of the resin film of the negative electrode collector are superimposed and welded to each other, and an inside surrounded by the resin films contains a non-aqueous electrolyte.

2. The non-aqueous electrolyte secondary battery according to claim 1,
wherein a thickness of the resin film to which the conductive layer having the thickness of 250 nm to 650 nm is fixed is 20 μm or less.

3. The non-aqueous electrolyte secondary battery according to claim 1,
wherein an electron conductivity at an interface with the conductive layer of the resin film to which the conductive layer having the thickness of 250 nm to 650 nm is fixed is $1 \times 10^5$ S/m or less.

4. The non-aqueous electrolyte secondary battery according to claim 1,
wherein the conductive layer of the positive electrode collector contains aluminum, and the conductive layer of the negative electrode collector contains at least one selected from copper and nickel.

5. The non-aqueous electrolyte secondary battery according to claim 1,
wherein the conductive layer having the thickness of 250 nm to 650 nm fixed to the resin film is a vapor-deposited film.

6. A collector comprising:
a resin film; and
a conductive layer fixed to one surface of the resin film,
wherein a thickness of the conductive layer is 250 nm to 650 nm.

7. The collector according to claim 6,
wherein a thickness of the resin film is 20 μm or less.

8. The collector according to claim 6,
wherein the conductive layer is a vapor-deposited film.

9. The collector according to claim 6,
wherein the conductive layer is not disposed on a periphery of the resin film.

10. A method for manufacturing a non-aqueous electrolyte secondary battery, comprising:
disposing the collector according to claim 6 as at least one collector of a positive electrode collector or a negative electrode collector.

11. The method for manufacturing a non-aqueous electrolyte secondary battery according to claim 10,
wherein the method includes disposing the collector according to claim 6 as the positive electrode collector and the negative electrode collector.

12. The method for manufacturing a non-aqueous electrolyte secondary battery according to claim 11,
wherein the method includes superimposing and welding a periphery of the resin film of the positive electrode collector and a periphery of the resin film of the negative electrode collector to enclose a non-aqueous electrolyte in an inside surrounded by the resin films.

13. A method for manufacturing a collector, comprising:
forming a conductive layer having a thickness of 250 nm to 650 nm on one surface of a resin film by vapor deposition or plating on a portion excluding a periphery of the resin film.

14. The non-aqueous electrolyte secondary battery according to claim 1,
wherein the conductive layer of at least one of the positive electrode collector or the negative electrode collector has a thickness of 300 nm to 600 nm.

15. The non-aqueous electrolyte secondary battery according to claim 1,
wherein the resin film of the positive electrode collector and the resin film of the negative electrode collector surround and encircle the positive electrode active material layer, the negative electrode active material layer and the separator.

* * * * *